United States Patent
Sakhnini et al.

(10) Patent No.: US 11,638,245 B2
(45) Date of Patent: Apr. 25, 2023

(54) PHYSICAL DOWNLINK CONTROL CHANNEL CANDIDATE HOPPING

(71) Applicant: QUALCOMM Incorporated, San Diego, CA (US)

(72) Inventors: Iyab Issam Sakhnini, San Diego, CA (US); Tao Luo, San Diego, CA (US); Wooseok Nam, San Diego, CA (US); Peter Pui Lok Ang, San Diego, CA (US); Juan Montojo, San Diego, CA (US); Olufunmilola Omolade Awoniyi-Oteri, San Diego, CA (US); Jelena Damnjanovic, Del Mar, CA (US); Linhai He, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/248,363

(22) Filed: Jan. 21, 2021

(65) Prior Publication Data
US 2021/0258934 A1      Aug. 19, 2021

Related U.S. Application Data

(60) Provisional application No. 62/977,112, filed on Feb. 14, 2020.

(51) Int. Cl.
*H04W 72/04* (2009.01)
(52) U.S. Cl.
CPC ................................. *H04W 72/042* (2013.01)
(58) Field of Classification Search
CPC .................................................. H04W 72/042
See application file for complete search history.

(56) References Cited

U.S. PATENT DOCUMENTS

2009/0191875 A1*   7/2009   Vujcic ................. H04W 74/004
2016/0285507 A1*   9/2016   Matsuo ............... H04W 40/244
(Continued)

OTHER PUBLICATIONS

Ericsson: "Remaining Issues on Search Spaces", 3GPP Draft, R1-1802903, 3GPP TSG RAN WG1 Meeting #92, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398292, 17 Pages, Retrieved from the Internet: URL:http://www.3gpp.org/ftp/tsg%5Fran/WG1%5FRL1/TSGR1%5F92/Docs/ [retrieved on Feb. 17, 2018] sections 1-3, Sections 2.4.1-2.4.2, 2.5 and 10.1; p. 7-p. 16, Figures 1. 2. 3. 4. 5. 6. 7, Table 1.

(Continued)

*Primary Examiner* — Ronald B Abelson
(74) *Attorney, Agent, or Firm* — Harrity & Harrity, LLP

(57) ABSTRACT

Methods and apparatuses described herein provide a physical downlink control channel (PDCCH) candidate hopping function that reduces collisions between PDCCH candidates, particularly between PDCCH candidates associated with reduced capability user equipment (UE). For example, the hopping function may be implemented as part of a PDCCH candidate to control channel element (CCE) function or may be applied separately from the PDCCH candidate to CCE function. The hopping function may reduce persistent collisions between PDCCH candidates by correlating the mapping behavior with a value that changes over time. Some techniques and apparatuses described herein provide signaling for configuration and activation/deactivation/modification of the hopping pattern. Thus, collisions between PDCCH candidates are reduced, thereby conserving computing resources and wireless communication resources. Furthermore, the reduction of collisions may (Continued)

improve performance of UEs with reduced PDCCH capabilities, such as reduced-capability UEs. Numerous other aspects are provided.

30 Claims, 11 Drawing Sheets

(56) References Cited

U.S. PATENT DOCUMENTS

| | | | |
|---|---|---|---|
| 2016/0295345 A1 | 10/2016 | Oh | |
| 2017/0134881 A1* | 5/2017 | Oh | H04L 5/14 |
| 2017/0288808 A1* | 5/2017 | Blankenship | H04W 72/0446 |
| 2017/0367046 A1 | 12/2017 | Papasakellariou | |
| 2018/0131483 A1* | 5/2018 | Somichetty | H04L 5/0094 |
| 2018/0192405 A1* | 7/2018 | Gong | H04W 72/042 |
| 2018/0288746 A1* | 10/2018 | Zhang | H04L 5/0048 |
| 2018/0295651 A1* | 10/2018 | Cao | H04W 72/042 |
| 2018/0317213 A1* | 11/2018 | Islam | H04W 72/0406 |
| 2019/0097762 A1* | 3/2019 | Jeon | H04L 1/1864 |
| 2019/0109732 A1* | 4/2019 | Choi | H04W 72/042 |
| 2019/0313434 A1* | 10/2019 | Zhou | H04W 72/042 |
| 2020/0213161 A1* | 7/2020 | Zhang | H04B 1/7143 |
| 2021/0099979 A1* | 4/2021 | Takeda | H04W 52/02 |
| 2021/0218502 A1* | 7/2021 | Park | H04L 5/0055 |

OTHER PUBLICATIONS

International Search Report and Written Opinion—PCT/US2021/070070—ISA/EPO—dated May 7, 2021.
Zte, et al., "Search Space Design and Related Issues", 3GPP TSG RAN WG1 Meeting #92Bis, 3GPP Draft; R1-1805263 Search Space Design and Related Issues, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), pp. 1-18, XP051427505, Retrieved from the Internet: URL: http://www.3gpp.org/ftp/Meetings%5F3GPP%5FSYNC/RAN1/Docs/ [retrieved on Apr. 15, 2018] Section III; p. 3-p. 7; figure 4.

* cited by examiner

PHYSICAL DOWNLINK CONTROL CHANNEL CANDIDATE HOPPING

CROSS-REFERENCE TO RELATED APPLICATION

This Patent Application claims priority to U.S. Provisional Patent Application No. 62/977,112, filed on Feb. 14, 2020, entitled "PHYSICAL DOWNLINK CONTROL CHANNEL CANDIDATE HOPPING," and assigned to the assignee hereof. The disclosure of the prior application is considered part of and is incorporated by reference into this Patent Application.

BACKGROUND

Field

Aspects of the present disclosure generally relate to wireless communication and to techniques and apparatuses for physical downlink control channel (PDCCH) candidate hopping.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

A user equipment (UE) may be a reduced-capability UE. A reduced-capability UE may be a device having reduced or lower capabilities relative to other UEs, such as enhanced mobile broadband (eMBB) UEs. For example, a reduced-capability UE may be equipped with fewer transmit and/or receive antennas, may be equipped with a lower-capability battery, may be equipped with fewer processing and/or memory resources (which may result in longer processing timelines), may only be capable of monitoring and/or processing a reduced frequency bandwidth, may only be capable of half-duplex frequency division duplexing, and/or the like. In some cases, a reduced-capability UE may have reduced capabilities due to a small form factor, due to keeping the cost of the reduced-capability UE low, and/or the like. Examples of reduced-capability UEs include an Internet of Things (IoT) device, a biometric sensor or device, a smart watch, smart clothing, smart glasses, a smart wrist band, smart jewelry, a vehicular component or sensor (e.g., cellular-enabled onboard diagnostic (OBD) devices), a smart meter or sensor, and/or the like.

A UE (e.g., a reduced-capability UE and/or other types of UEs) may be capable of performing physical downlink control channel (PDCCH) processing, which may include identifying and decoding PDCCH communications. The UE may perform PDCCH processing based at least in part on a control resource set (CORESET). A CORESET is a region in time and frequency (e.g., multiple resource blocks (RBs) and one or more symbols). A CORESET includes multiple resource element groups (REGs). A REG may be composed of resource elements (REs) and may be the smallest building block of the CORESET. A group of REGs (e.g., 6 REGs) may form a control channel element (CCE). There can be multiple CCEs in a CORESET (e.g., 48 CCEs or a different, configurable number). A PDCCH candidate may map to a subset of the CCEs associated with a CORESET and may be associated with a search space. A search space can be common (e.g., a common search space (CSS) or a UE-specific search space (UESS or USS). A UE may scan for PDCCH candidates in a CSS using a radio network temporary identifier and/or cyclic redundancy check (RNTI/CRC) based matching approach, with multiple PDCCH hypotheses at different aggregation levels. A UESS may be configured for a particular UE. For example, grants for a physical downlink shared channel (PDSCH) or a physical uplink shared channel (PUSCH) may be transmitted to the UE via the UESS. Within a CORESET, multiple UEs can be assigned the same UESS with the idea that a relatively low proportion of UEs will be active at a given time.

However, a reduced capability UE may constrain the resources that can be used for PDCCH reception and processing, thereby increasing collisions. For example, the reduced capability UE may be associated with a reduced PDCCH monitoring configuration based at least in part on a smaller number of blind decodes and CCE limits. This may lead to a reduction in the number of PDCCH candidates that can be configured, meaning that there are less resources per CORESET for use by the network to multiplex PDCCH messages. Thus, PDCCH messages targeted to multiple users may be more likely to collide, causing PDCCH decode errors. This may be exacerbated by the hashing function used to map PDCCH candidates to CCEs. For example, the PDCCH candidate to CCE mapping may be fixed for the CSS and may change within a timeframe for the UESS (e.g., based at least in part on a UE's cell RNTI). There is a probability that multiple UEs with different C-RNTIs may have the same PDCCH candidate to CCE mapping, which may be increased with the diminution of the reduced capability UE's PDCCH capability. Thus, reduced capability UEs may be associated with an increased likelihood of persistent collision of PDCCH candidates.

Some techniques and apparatuses described herein provide a PDCCH candidate hopping function that reduces collisions between PDCCH candidates, particularly between PDCCH candidates associated with reduced capability UEs. For example, the hopping function may be implemented as part of a PDCCH candidate to CCE function (e.g., a hashing function and/or the like) or may be applied separately from the PDCCH candidate to CCE hashing function. The hopping function may reduce persistent collisions between PDCCH candidates by correlating the mapping behavior with a value that changes over time (e.g., a starting symbol number, a slot number, a system frame number, a bandwidth part or sub-band, a CORESET number, a search space number, and/or the like). Some techniques and apparatuses described herein provide signaling for configuration and activation/deactivation/modification of the hopping pattern. Thus, collisions between PDCCH candidates are reduced, thereby conserving computing resources and wireless communication resources. Furthermore, the reduction of collisions may improve performance of UEs with reduced PDCCH capabilities, such as reduced-capability UEs.

In some aspects, a method of wireless communication, performed by a base station, may include mapping a downlink control channel candidate to a set of CCEs based at least in part on a hopping pattern; and transmitting the downlink control channel candidate on the set of CCEs.

In some aspects, a method of wireless communication, performed by a UE, may include determining a hopping pattern for a downlink control channel candidate, wherein the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping; and scanning for the downlink control channel candidate on a set of CCEs based at least in part on the hopping pattern.

In some aspects, a base station for wireless communication may include a memory and one or more processors operatively coupled to the memory. The memory and the one or more processors may be configured to map a downlink control channel candidate to a set of CCEs based at least in part on a hopping pattern, wherein the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping; and transmit the downlink control channel candidate on the set of CCEs.

In some aspects, a UE for wireless communication may include a memory and one or more processors operatively coupled to the memory. The memory and the one or more processors may be configured to determine a hopping pattern for a downlink control channel candidate, wherein the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping; and scan for the downlink control channel candidate on a set of CCEs based at least in part on the hopping pattern.

In some aspects, a non-transitory computer-readable medium may store one or more instructions for wireless communication. The one or more instructions, when executed by one or more processors of a base station, may cause the one or more processors to map a downlink control channel candidate to a set of CCEs based at least in part on a hopping pattern, wherein the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping; and transmit the downlink control channel candidate on the set of CCEs.

In some aspects, a non-transitory computer-readable medium may store one or more instructions for wireless communication. The one or more instructions, when executed by one or more processors of a UE, may cause the one or more processors to determine a hopping pattern for a downlink control channel candidate, wherein the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping; and scan for the downlink control channel candidate on a set of CCEs based at least in part on the hopping pattern.

In some aspects, an apparatus for wireless communication may include means for mapping a downlink control channel candidate to a set of CCEs based at least in part on a hopping pattern, wherein the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping; and means for transmitting the downlink control channel candidate on the set of CCEs.

In some aspects, an apparatus for wireless communication may include means for determining a hopping pattern for a downlink control channel candidate, wherein the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping; and means for scanning for the downlink control channel candidate on a set of CCEs based at least in part on the hopping pattern.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
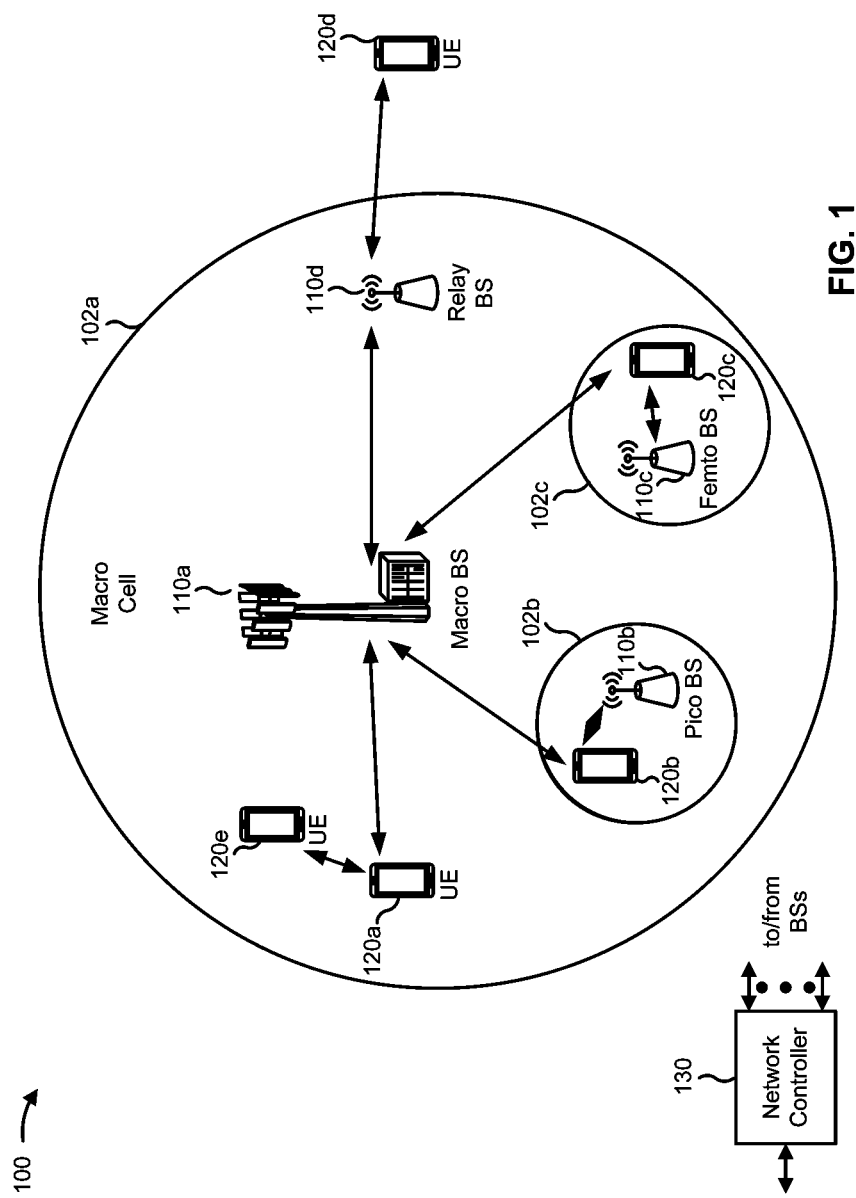
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G radio access technology (RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 in which aspects of the present disclosure may be practiced. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor/device, a wearable device (a smart watch, smart clothing, smart glasses, a smart wrist band, smart jewelry (e.g., a smart ring, a smart bracelet)), an entertainment device (e.g., a music or video device, or a satellite radio), a vehicular component or sensor, a smart meter/sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some cases, UEs 120 may communicate in a dual-connectivity mode, a carrier aggregation mode, and/or the like, which may include a primary cell (PCell) and one or more secondary cells (SCells) that are associated with the same BS 110 or different BSs 110. In some aspects, a BS 110 may use the PCell to transmit control signaling related to the SCell(s). For example, in some aspects, the control signaling may include downlink control information (DCI) that includes an SCell dormancy indicator to identify one or more SCells that are operating in a dormancy mode. Additionally, in some cases, the DCI may include a request for one-shot hybrid automatic repeat request (HARD) acknowledgement (ACK) codebook feedback, such as when the UE communicates with one or more SCells in an unlicensed spectrum. In some aspects, when the DCI includes the SCell dormancy indicator and triggers one-shot HARQ-ACK codebook feedback, the BS 110 may determine a format for the DCI and configure one or more DCI messages to include fields for the SCell dormancy indicator and the request for HARQ-ACK feedback. For example, the SCell dormancy indicator and the request for HARQ-ACK feedback may be provided in one or more fields that are appended to a DCI message that schedules data, in one or more unused fields of a DCI message that does not schedule data, and/or the like. Furthermore, in cases where the DCI message does not schedule data, the DCI message may include a predefined value in a frequency domain resource allocation (FDRA) field to indicate that the DCI message does not schedule data such that the UE may know to decode the SCell dormancy indicator and the request for HARQ-ACK feedback from the one or more unused fields of the DCI message.

As indicated above, FIG. 1 is provided merely as an example. Other examples may differ from what is described with regard to FIG. 1.

Figure 2:
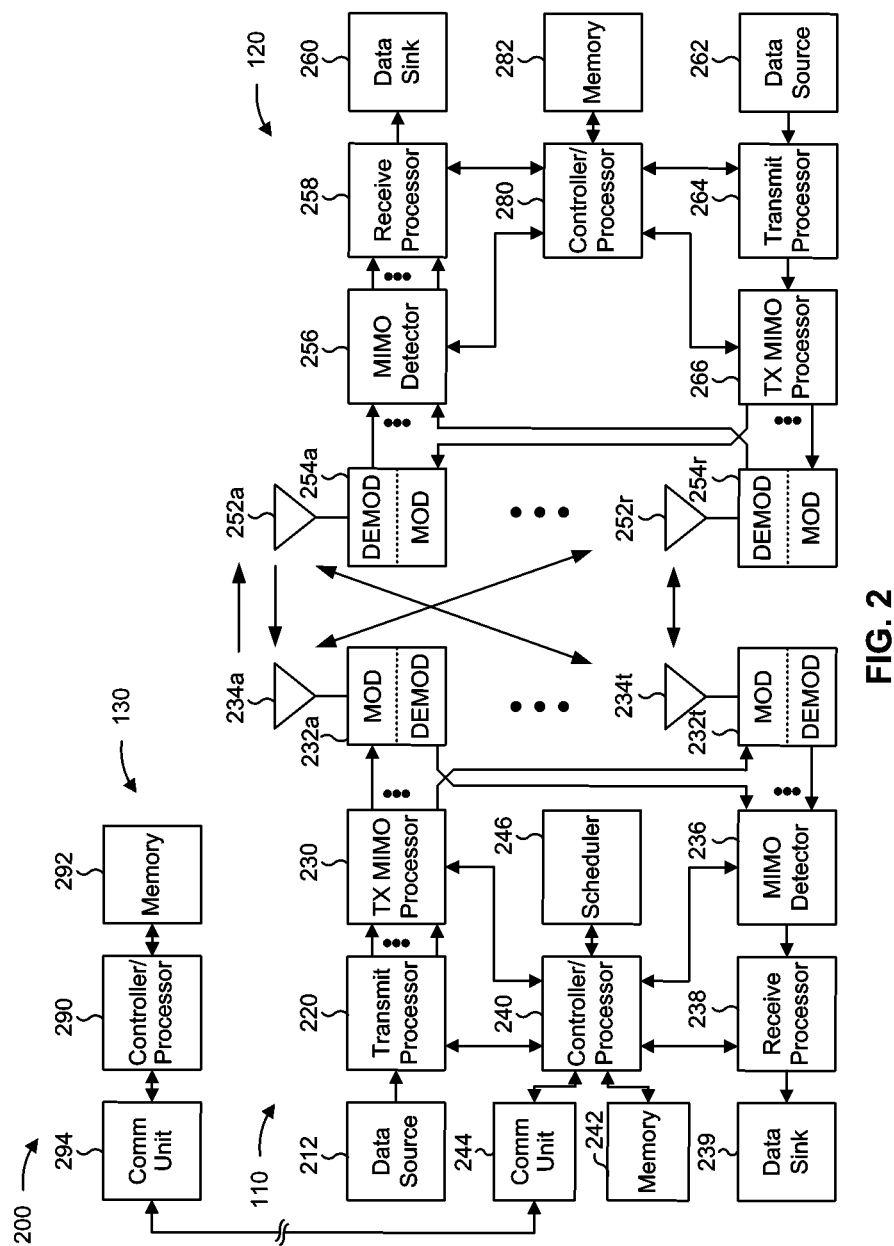
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal (e.g., an RRC signal to configure one or more component carrier sets, a medium access control control element (MAC-CE) to indicate a beam update command, and/or the like). T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP), a received signal strength indicator (RSSI), a reference signal received quality (RSRQ), a channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with physical downlink control channel (PDCCH) candidate hopping, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 900 of FIG. 9, and/or other processes as described herein. Memories 242 and 282 may store data and program codes for BS 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, method 600 of FIG. 6, method 900 of FIG. 9, and/or other processes as described herein. In some aspects, executing instructions may include running the instructions, converting the instructions, compiling the instructions, interpreting the instructions, and/or the like.

As indicated above, FIG. 2 is provided merely as an example. Other examples may differ from what is described with regard to FIG. 2.

A UE may be a reduced-capability UE. A reduced-capability UE may be a device having reduced or lower capabilities relative to other UEs, such as enhanced mobile broadband (eMBB) UEs. For example, a reduced-capability UE may be equipped with fewer transmit and/or receive antennas, may be equipped with a lower-capability battery, may be equipped with fewer processing and/or memory resources (which may result in longer processing timelines), may only be capable of monitoring and/or processing a reduced frequency bandwidth, may only be capable of half-duplex frequency division duplexing, and/or the like. In some cases, a reduced-capability UE may have reduced capabilities due to a small form factor, due to keeping the cost of the reduced-capability UE low, and/or the like. Examples of reduced-capability UEs may include an IoT device, a biometric sensor or device, a smart watch, smart clothing, smart glasses, a smart wrist band, smart jewelry, a vehicular component or sensor (e.g., cellular-enabled onboard diagnostic (OBD) devices), a smart meter or sensor, and/or the like.

A UE (e.g., a reduced-capability UE and/or other types of UEs) may be capable of performing PDCCH processing, which may include identifying and decoding PDCCH communications. The UE may perform PDCCH processing based at least in part on a control resource set (CORESET). A CORESET is a region in time and frequency (e.g., multiple resource blocks (RBs) and one or more symbols). A CORESET includes multiple resource element groups (REGs). A REG may be composed of resource elements (REs) and may be the smallest building block of the CORESET. A group of REGs (e.g., 6 REGs) may form a control channel element (CCE). There can be multiple CCEs in a CORESET (e.g., 48 CCEs or a different, configurable number). A PDCCH candidate may map to a subset of the CCEs associated with a CORESET and may be associated with a search space. A search space can be common (e.g., a common search space (CSS) or a UE-specific search space (UESS or USS). A UE may scan for PDCCH candidates in a CSS using a radio network temporary identifier and/or cyclic redundancy check (RNTI/CRC) based matching approach, with multiple PDCCH hypotheses at different aggregation levels. A UESS may be configured for a particular UE. For example, grants for a physical downlink shared channel (PDSCH) or a physical uplink shared channel (PUSCH) may be transmitted to the UE via the UESS. Within a CORESET, multiple UEs can be assigned the same UESS with the idea that a relatively low proportion of UEs will be active at a given time.

However, a reduced capability UE may constrain the resources that can be used for PDCCH reception and processing, thereby increasing collisions. For example, the reduced capability UE may be associated with a reduced PDCCH monitoring configuration based at least in part on a smaller number of blind decodes and CCE limits. This may lead to a reduction in the number of PDCCH candidates that can be configured, meaning that there are less resources per CORESET for use by the network to multiplex PDCCH messages. Thus, PDCCH messages targeted to multiple users may be more likely to collide, cause PDCCH decode errors. This may be exacerbated by the hashing function used to map PDCCH candidates to CCEs. For example, the PDCCH candidate to CCE mapping may be fixed for the CSS and may change within a timeframe for the UESS (e.g., based at least in part on a UE's cell RNTI (C-RNTI)). There is a probability that multiple UEs with different C-RNTIs may have the same PDCCH candidate to CCE mapping, which may be increased with the diminution of the reduced capability UE's PDCCH capability. Thus, reduced capability UEs may be associated with an increased likelihood of persistent collision of PDCCH candidates.

Some techniques and apparatuses described herein provide a PDCCH candidate hopping function that reduces collisions between PDCCH candidates, particularly between PDCCH candidates associated with reduced capability UEs. For example, the hopping function may be implemented as part of a PDCCH candidate to CCE hashing function or may be applied separately from the PDCCH candidate to CCE hashing function. The hopping function may reduce persistent collisions between PDCCH candidates by correlating the mapping behavior with a value that changes over time (e.g., a starting symbol number, a slot number, a system frame number, a bandwidth part or sub-band, a CORESET number, a search space number, and/or the like). Some techniques and apparatuses described herein provide signaling for configuration and activation/deactivation/modification of the hopping pattern. Thus, collisions between PDCCH candidates are reduced, thereby conserving computing resources and wireless communication resources. Furthermore, the reduction of collisions may improve performance of UEs with reduced PDCCH capabilities, such as reduced-capability UEs.

It should be noted that many of the techniques and apparatuses described herein are described with reference to hashing functions. However, these techniques and apparatuses described herein can use functions other than hashing functions to determine a PDCCH candidate to CCE mapping.

Figure 3:
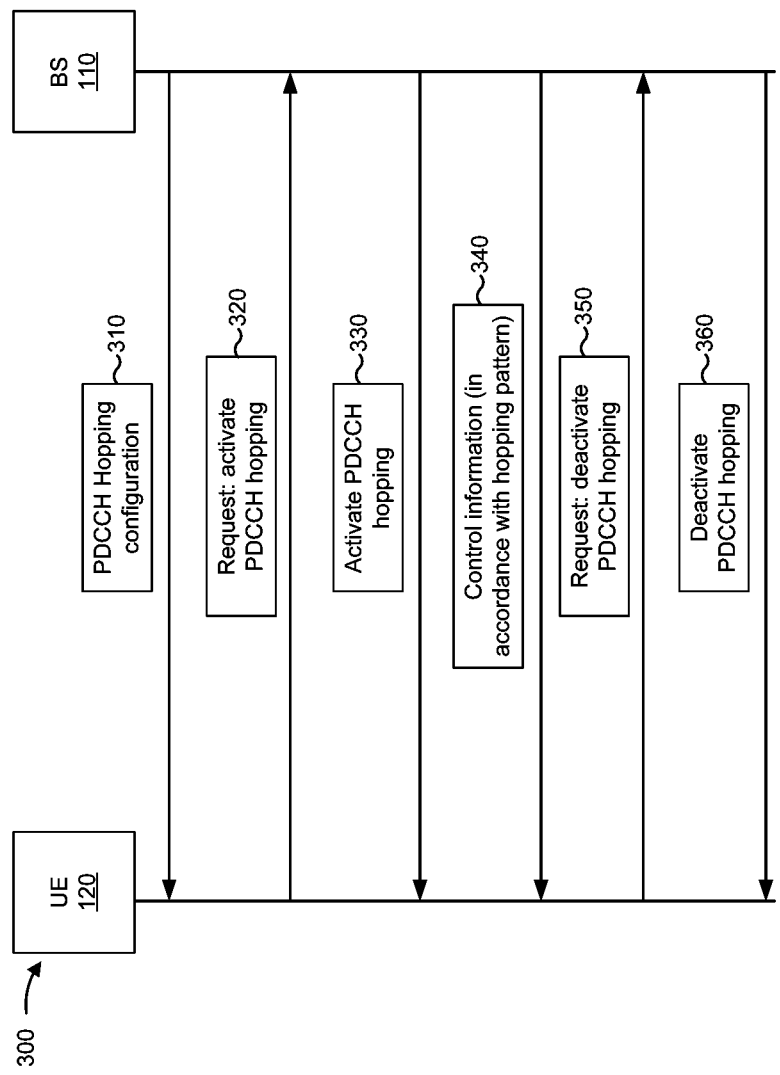
FIG. 3 is a diagram illustrating an example of configuring a physical downlink control channel (PDCCH) candidate hopping pattern and communicating using the PDCCH candidate hopping pattern.

FIG. 3 is a diagram illustrating an example 300 of configuring a PDCCH candidate hopping pattern and communicating using the PDCCH candidate hopping pattern. As shown, example 300 includes a UE 120 and a BS 110. In some aspects, the UE 120 may be a reduced capability UE.

As shown by reference number 310, the BS 110 may transmit a PDCCH hopping configuration to the UE 120. For example, the UE 120 may support one or more PDCCH hopping configurations (also referred to herein as hopping pattern configurations). A hopping pattern configuration may indicate one or more parameters for performing PDCCH hopping, which are described in connection with reference number 340. In some aspects, a hopping pattern may indicate a condition for activating and/or deactivating hopping, such as an explicit indication condition, a timer, an event-based condition (e.g., a signaled event, a bandwidth part (BWP) switch, a grant parameter, an aggregation level usage, a threshold failure of PDCCH decoding, and/or the like), and/or the like. In some aspects, the PDCCH hopping configuration may be provided using higher layer signaling (e.g., radio resource control (RRC) signaling and/or the like), downlink control information (DCI) signaling, a combination of RRC signaling and DCI signaling (e.g., a DCI configuration can complement, modify, or override an RRC configuration), and/or the like. In some aspects, the PDCCH hopping configuration may be preconfigured (e.g., in a wireless communication standard and/or the like). In some aspects, the PDCCH hopping configuration may configure multiple hopping configurations or patterns, and one of the multiple hopping configurations or patterns may be subsequently activated.

As shown by reference number 320, UE 120 may transmit a request to activate PDCCH hopping. For example, the UE 120 may transmit the request to activate PDCCH hopping based at least in part on a condition (e.g., based at least in part on PDCCH decoding failing a threshold number of times, which may indicate a persistent collision associated with the UE 120). As another example, the UE 120 may transmit the request based at least in part on a device type of the UE 120. For example, the UE 120 may transmit the request based at least in part on the UE 120 being a reduced-capability UE. In some aspects, the request may be implicit in another communication of the UE 120, such as a communication indicating that the UE 120 is a reduced capability UE 120 and/or the like.

As shown by reference number 330, the BS 110 may transmit an indication to activate PDCCH hopping. In some aspects, the BS 110 may transmit the indication to activate PDCCH hopping based at least in part on receiving the request indicated by reference number 320. In some aspects, the BS 110 may transmit the indication to activate PDCCH hopping without having received the request (e.g., the UE 120 may not transmit the request). In some aspects, the indication shown by reference number 330 may indicate a PDCCH hopping configuration. For example, the indication may carry the PDCCH hopping configuration, or may include an identifier corresponding to a configured PDCCH hopping configuration of the UE 120. In some aspects, the indication shown by reference number 330 may be provided using RRC signaling, a medium access control (MAC) control element (CE), DCI, and/or the like. In some aspects, the indication may pertain to a particular BWP or aggregation level and may activate PDCCH hopping for the particular BWP or aggregation level.

As shown by reference number 340, the BS 110 may transmit, to the UE 120, control information in accordance with the hopping pattern. For example, the BS 110 and the UE 120 may activate the hopping pattern indicated by the indication shown by the reference number 330. In other words, the BS 110 and the UE 120 may determine a PDCCH candidate to CCE mapping using a hashing function and the activated hopping pattern. A description of the hashing function, then potential hopping patterns, is provided below.

The UE 120 and the BS 110 may use a hashing function to map PDCCH candidates to CCEs. For example, for a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i,$$

where L, $m_{s,n_{CI}}$, $N_{CCE,p}$, $M_{s,max}^{(L)}$, and $n_{CI}$ are fixed across slots. $N_{CCE,p}$ is the number of CCEs, numbered from 0 to $N_{CCE,p}-1$, in CORESET p. For any CSS, $M_{s,max}^{(L)}=M_{s,0}^{(L)}$, and for a USS, $M_{s,max}^{(L)}$ is the maximum of $M_{s,n_{CI}}^{(L)}$ over all configured $n_{CI}$ values for a CCE aggregation level L of search space set s. $Y_{p,n_{s,f}^{\mu}}=(A_p \cdot Y_{p,n_{s,f}^{\mu}-1}) \bmod D$, where $A_p=\{39827,39829,39839\}$ for p mod r={0,1,2}, when r=3. For the CSS, $Y_{p,n_{s,f}^{\mu}}$ may be fixed (=0) across all slots in a frame. For the USS $Y_{p,n_{s,f}^{\mu}}$ resets to C-RNTI every frame (initialized with UE's C-RNTI for slot 0 within frame), and changes after that based at least in part on the slot index within the frame.

Furthermore, the UE 120 and the BS 110 may use a hopping pattern to map PDCCH candidates to CCEs. The hopping pattern may vary over time so that a persistent collision between two or more PDCCH candidates of UEs associated with different C-RNTIs can be avoided. The hopping pattern may be defined to be a function of one or more of a starting symbol number of a PDCCH within a slot or a span, a slot number within a frame, a system frame number of a frame, a bandwidth part of the UE 120 on which the PDCCH is to be transmitted, a sub-band of the UE 120 on which the PDCCH is to be transmitted, a CORESET number (e.g., when the hopping pattern involves cross CORESET hopping), a search space number (e.g., when the hopping pattern involves cross search space hopping), and/or the like. In some aspects, the hopping pattern may involve a modification to the hashing function described above. For example, the hopping pattern may modify a value of r used to determine $A_p$ (e.g., using a value greater than 3) so that a larger number of CORESETs is used for the hashing function than in the hashing function shown above. This may be considered as defining one or more virtual CORESETs for the hashing function. Thus, a number of collisions between PDCCH candidates for different UEs based at least in part on CORESET alignment across slots is reduced.

In some aspects, the hopping pattern may be within a BWP or sub-band. In some aspects, the hopping pattern may be across two or more BWPs or sub-bands. For examples of these approaches, refer to FIG. 4. In some aspects, the hopping pattern may relate to particular PDCCH candidates. For example, the UE 120 and the BS 10 may apply the hopping pattern only for the particular PDCCH candidates (e.g., PDCCH candidates associated with reduced-capability UEs and/or the like). This may improve network efficiency relative to applying a hopping pattern for all PDCCH candidates. In some aspects, the hopping pattern may apply to all PDCCH candidates, which may reduce the likelihood of collision across all PDCCH candidates.

In some aspects, the hopping pattern may apply for a particular combination of two or more of a CORESET, a search space, an aggregation level (AL), or a carrier. For example, the hopping pattern may define a hopping pattern within a {CORESET, search space, AL, carrier} combination. In some aspects, the hopping pattern may apply to all CORESETs irrespective of search space, aggregation level, and/or carrier. For example, the hopping pattern may extend across multiple CORESETs. For examples of these approaches, refer to FIG. 5.

As shown by reference number 350, the UE 120 may transmit a request to deactivate PDCCH hopping. In some aspects, the request may be implicit in another communication of the UE 120, such as a communication indicating that the UE 120 is to be deactivated, that the UE 120 is to enter an idle mode, and/or the like.

In some aspects, the UE 120 may determine that PDCCH hopping is to be deactivated. For example, the UE 120 may determine that PDCCH hopping is to be deactivated based at least in part on an indication from the BS 110 (described below). In some aspects, the UE 120 may determine that PDCCH hopping is to be deactivated based at least in part on a timer. For example, the timer may be based at least in part on a number of frames. In some aspects, the timer may be configured and/or initiated at the configuration stage and/or the triggering stage. In some aspects, the UE 120 may determine that PDCCH hopping is to be deactivated based at least in part on an event (e.g., a signaled event, an event preconfigured for the UE 120 such as specified by a wireless communication standard, and/or the like), such as a BWP switch and/or the like.

In some aspects, the UE 120 and/or the BS 110 may activate, deactivate, or modify PDCCH hopping based at least in part on a rule. For example, the rule may indicate a parameter based at least in part on which to activate, deactivate or modify the PDCCH hopping configuration. In some aspects, the parameter may be based at least in part on a number of consecutive grants received by the UE 120 or a grant using a particular aggregation level (e.g., the UE 120 may fall back to a default hopping configuration or a non-hopping configuration when the grant uses the particular aggregation level).

As shown by reference number 360, the BS 110 may transmit an indication to deactivate PDCCH hopping. For example, the indication may be provided using RRC signaling, MAC-CE signaling, DCI signaling, and/or the like. In some aspects, the BS 110 may provide the indication to deactivate the PDCCH hopping based at least in part on the request shown by reference number 350. In some aspects, the BS 110 may provide the indication without receiving the request shown by reference number 350 (e.g., the UE 120 may not transmit the request).

As indicated above, FIG. 3 is provided as an example. Other examples may differ from what is described with respect to FIG. 3.

Figure 4:
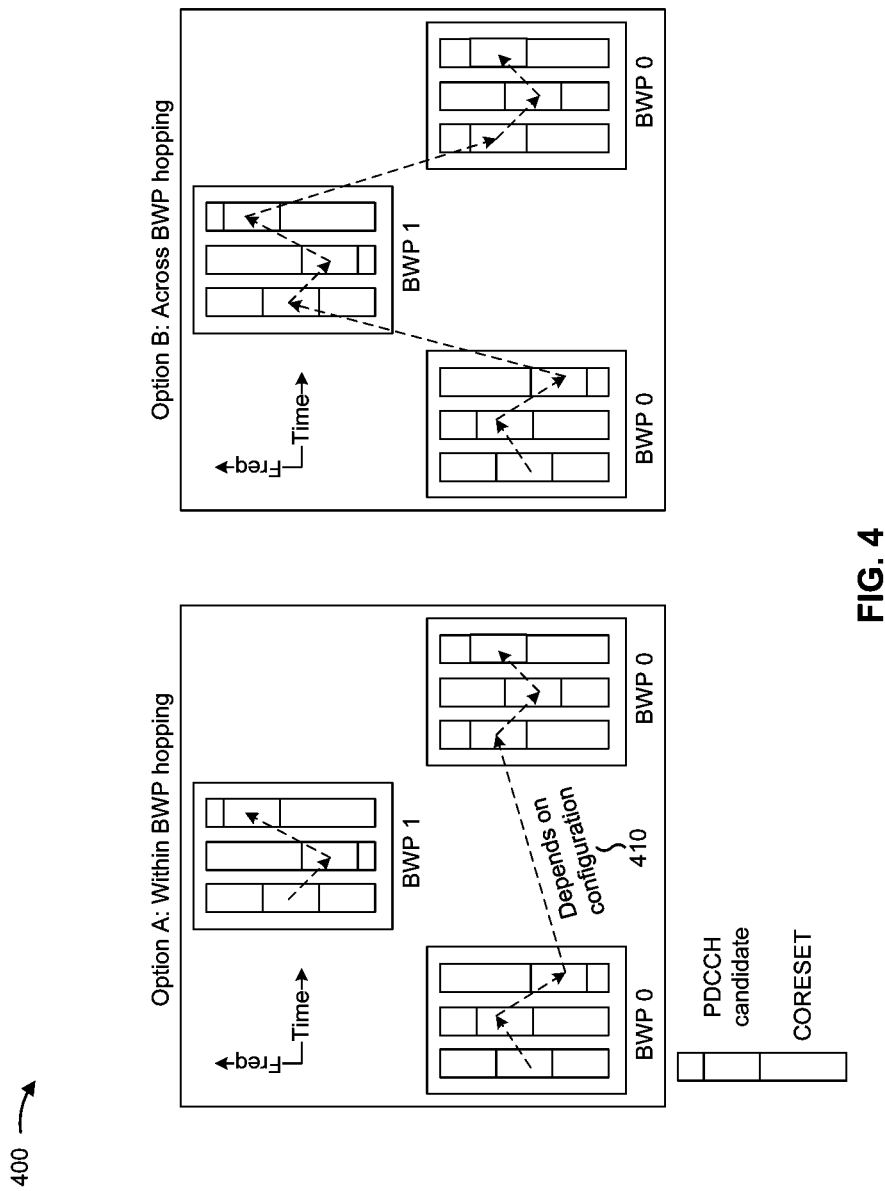
FIGS. 4 and 5 are diagrams illustrating examples of PDCCH candidate hopping patterns.
Figure 5:
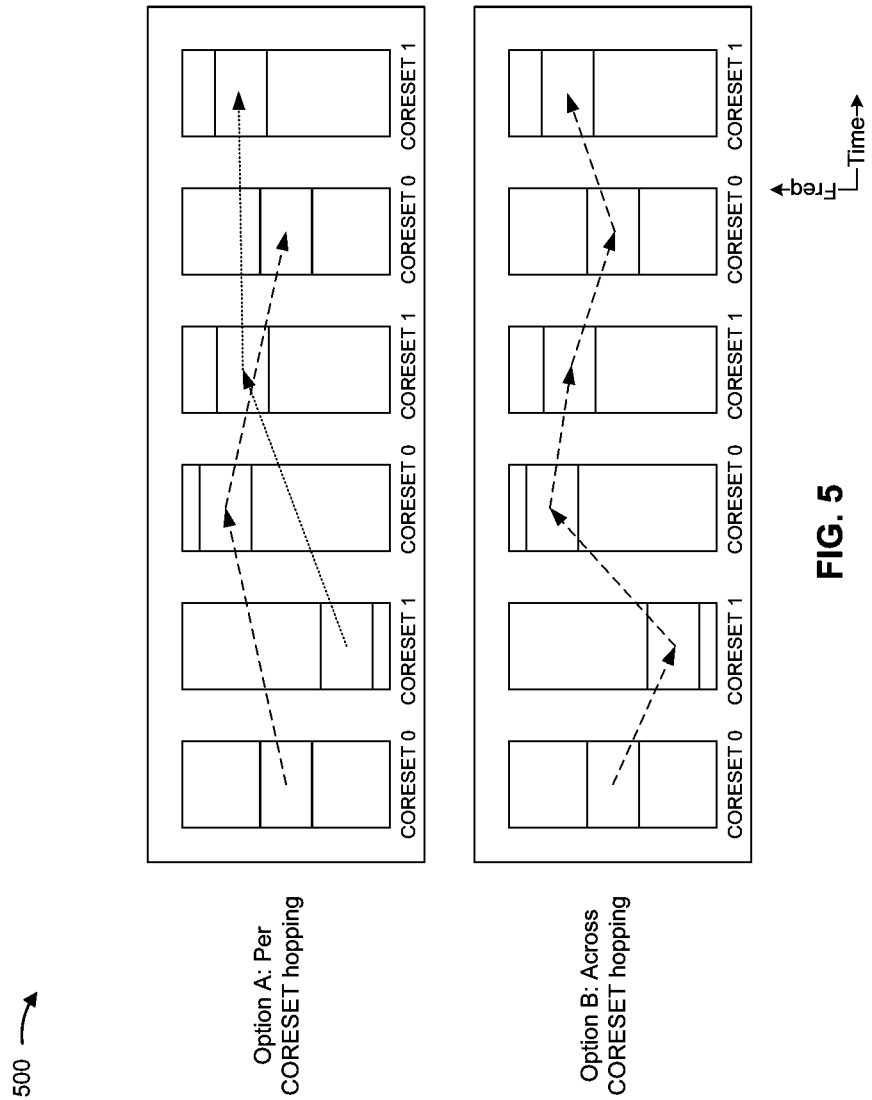

FIGS. 4 and 5 are diagrams illustrating examples 400 and 500 of PDCCH candidate hopping patterns. FIG. 4 shows an example of a hopping pattern that is configured for hopping within a BWP (Option A, shown in the left part of FIG. 4), and a hopping pattern that is configured for hopping across BWPs (Option B, shown in the right part of FIG. 4). In Option A, hopping occurs on different PDCCH candidates of a CORESET of a BWP, and does not continue between different BWPs. For example, the hopping pattern may be specific to the BWP. In some aspects, in Option A, hopping may continue across CORESETs of a same BWP over time, as shown by reference number 410. In Option B, hopping continues across different BWPs and CORESETs. For example, the hopping pattern may continue as the BWP changes (e.g., may be transparent to BWP).

FIG. 5 shows an example of per-CORESET hopping patterns (Option A, at the top of FIG. 5) and cross-CORESET hopping patterns (Option B, at the bottom of FIG. 5). As shown in Option A, in some aspects, two CORESETs (e.g., CORESET 0 and CORESET 1) may be associated with respective hopping patterns, and hopping may not occur between the two CORESETs. In Option B, in some aspects, hopping can occur across the two CORESETs.

As indicated above, FIGS. 4 and 5 are provided as one or more examples. Other examples may differ from what is described with respect to FIGS. 4 and 5.

Figure 6:
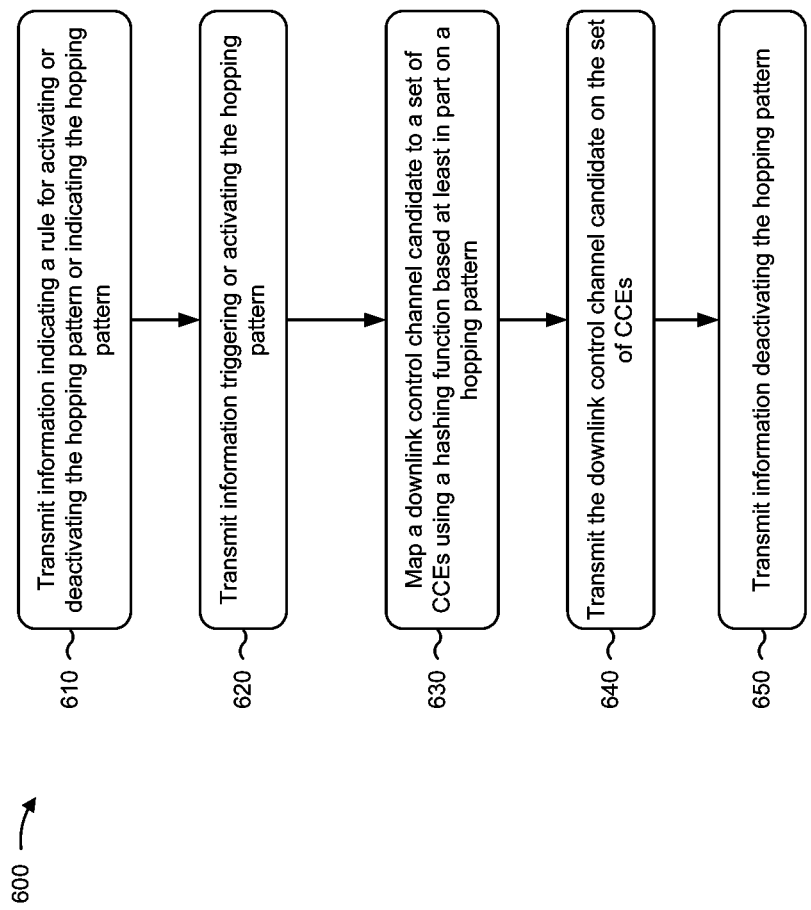
FIG. 6 is a flowchart of a method of wireless communication.

FIG. 6 is a flowchart of a method 600 of wireless communication. The method may be performed by a base station (e.g., the base station 110 of FIG. 1, the apparatus 702/805, and/or the like).

At 610, the base station (e.g., using controller/processor 240, transmit processor 220, TX MIMO processor 230, MOD 232, antenna 234, and/or the like) may transmit information indicating a rule for activating or deactivating the hopping pattern or indicating the hopping pattern. For example, the base station may transmit information indicating a configuration for the hopping pattern. In some aspects, the information indicating the configuration includes a dynamic parameter that overrides a semi-static parameter associated with the configuration. In some aspects, the hopping pattern is based at least in part on at least one of: a starting symbol number within a slot or a span, a slot number within a frame, a system frame number, a bandwidth part, a sub-band, a control resource set (CORESET) number based at least in part on the hopping pattern using cross-CORESET hopping, or a search space number based at least in part on the hopping pattern using cross-search space hopping.

At 620, the base station (e.g., using controller/processor 240, transmit processor 220, TX MIMO processor 230, MOD 232, antenna 234, and/or the like) may transmit information triggering or activating the hopping pattern. In some aspects, the hopping pattern is configured and activated dynamically. In some aspects, the hopping pattern is configured and activated semi-statically. In some aspects, the information triggering or activating the hopping pattern indicates a set of parameters for which the hopping pattern is triggered or activated.

At 630, the base station may map a downlink control channel candidate to a set of CCEs based at least in part on a hopping pattern. For example, the base station (e.g., using controller/processor 240, transmit processor 220, TX MIMO processor 230, MOD 232, antenna 234, and/or the like) may map a downlink control channel candidate to a set of CCEs. In some aspects, the base station may use a function (e.g., a PDCCH candidate to CCE function) based at least in part on a hopping pattern, as described above. In some aspects, the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping.

At 640, the base station (e.g., using controller/processor 240, transmit processor 220, TX MIMO processor 230, MOD 232, antenna 234, and/or the like) may transmit the downlink control channel candidate on the set of CCEs. For example, the base station may scramble the downlink control channel candidate (e.g., PDCCH) using a RNTI associated with the UE, and may transmit the downlink control channel candidate on the set of CCEs.

At 650, the base station (e.g., using controller/processor 240, transmit processor 220, TX MIMO processor 230, MOD 232, antenna 234, and/or the like) may transmit information deactivating the hopping pattern. For example, the base station may deactivate the hopping pattern based at least in part on a request received from the UE or based at least in part on determining that the hopping pattern is to be deactivated.

Method 600 may include additional aspects, such as any single aspect or any combination of aspects described below and/or in connection with one or more other processes described elsewhere herein.

In a first aspect, the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping.

In a second aspect, alone or in combination with the first aspect, the hopping pattern uses a control resource set mapping function, of the function, associated with a divisor greater than 3.

In a third aspect, alone or in combination with one or more of the first and second aspects, the hopping pattern is performed within a sub-band or a bandwidth part.

In a fourth aspect, alone or in combination with one or more of the first through third aspects, the hopping pattern is specific to the sub-band or the bandwidth part.

In a fifth aspect, alone or in combination with one or more of the first through fourth aspects, the hopping pattern is performed across two or more sub-bands or bandwidth parts.

In a sixth aspect, alone or in combination with one or more of the first through fifth aspects, the hopping pattern is consistent across a bandwidth part change.

In a seventh aspect, alone or in combination with one or more of the first through sixth aspects, the hopping pattern is used for a subset of downlink control channel candidates that includes the downlink control channel candidate.

In an eighth aspect, alone or in combination with one or more of the first through seventh aspects, the hopping pattern is used for all downlink control channel candidates associated with the base station or the UE.

In a ninth aspect, alone or in combination with one or more of the first through eighth aspects, the hopping pattern is used for all control resource sets associated with the base station or the UE.

In a tenth aspect, alone or in combination with one or more of the first through ninth aspects, the hopping pattern is based at least in part on a combination of at least two of: a control resource set of the downlink control channel candidate, a search space of the downlink control channel candidate, an aggregation level of the downlink control channel candidate, or a carrier of the downlink control channel candidate.

In an eleventh aspect, alone or in combination with one or more of the first through tenth aspects, method 600 includes transmitting information indicating a configuration for the hopping pattern, wherein the information indicating the configuration includes a dynamic parameter that overrides a semi-static parameter associated with the configuration.

In a twelfth aspect, alone or in combination with one or more of the first through eleventh aspects, method 600 includes transmitting information triggering or activating the hopping pattern.

In a thirteenth aspect, alone or in combination with one or more of the first through twelfth aspects, the hopping pattern is configured and activated dynamically.

In a fourteenth aspect, alone or in combination with one or more of the first through thirteenth aspects, the hopping pattern is configured and activated semi-statically.

In a fifteenth aspect, alone or in combination with one or more of the first through fourteenth aspects, the information triggering or activating the hopping pattern indicates a set of parameters for which the hopping pattern is triggered or activated.

In a sixteenth aspect, alone or in combination with one or more of the first through fifteenth aspects, method 600 includes transmitting information deactivating the hopping pattern.

In a seventeenth aspect, alone or in combination with one or more of the first through sixteenth aspects, method 600 includes transmitting information indicating a rule for activating or deactivating the hopping pattern or indicating the hopping pattern.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
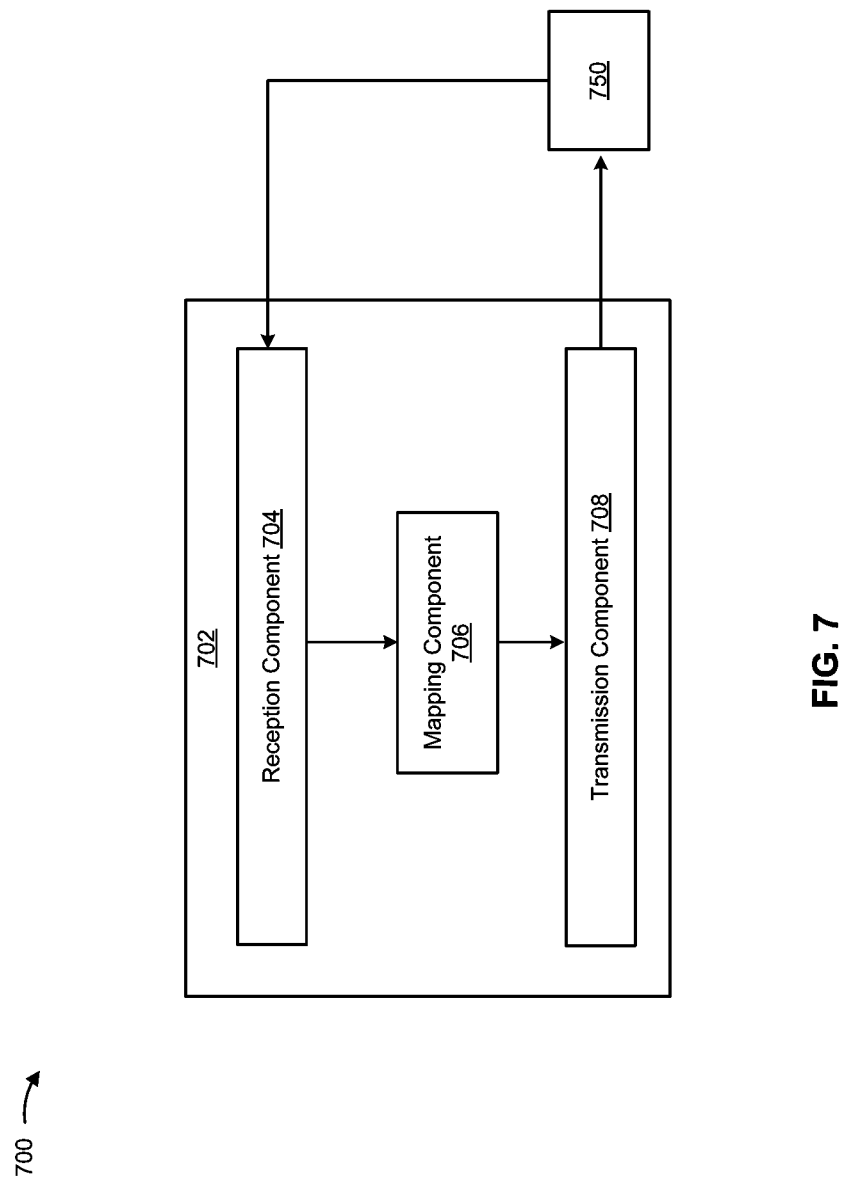
FIG. 7 is a data flow diagram illustrating data flow between different components in an example apparatus.

FIG. 7 is a conceptual data flow diagram 700 illustrating the data flow between different components in an example apparatus 702. The apparatus 702 may be a base station. In some aspects, the apparatus 702 includes a reception component 704, a mapping component 706, and/or a transmission component 708. As shown, the apparatus 702 may communicate with another apparatus 750 (e.g., a UE, a base station, or another wireless communication device) using the reception component 704 and/or the transmission component 708.

The mapping component 706 may map a downlink control channel candidate to a set of CCEs based at least in part on a hopping pattern. The transmission component 708 may transmit control information on the downlink control channel candidate (also referred to herein as transmitting the downlink control channel candidate) on the set of CCEs. In some aspects, the transmission component 708 may transmit information indicating a configuration for the hopping pattern, information triggering or activating the hopping pattern, information deactivating the hopping pattern, or information indicating a rule for activating or deactivating the hopping pattern or indicating the hopping pattern. In some aspects, the reception component 704 may receive transmissions from the apparatus 750, such as a request to activate or deactivate a hopping pattern.

The apparatus may include additional components that perform each of the blocks of the algorithm in the aforementioned method 600 of FIG. 6, and/or the like. Each block in the aforementioned method 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

Figure 8:
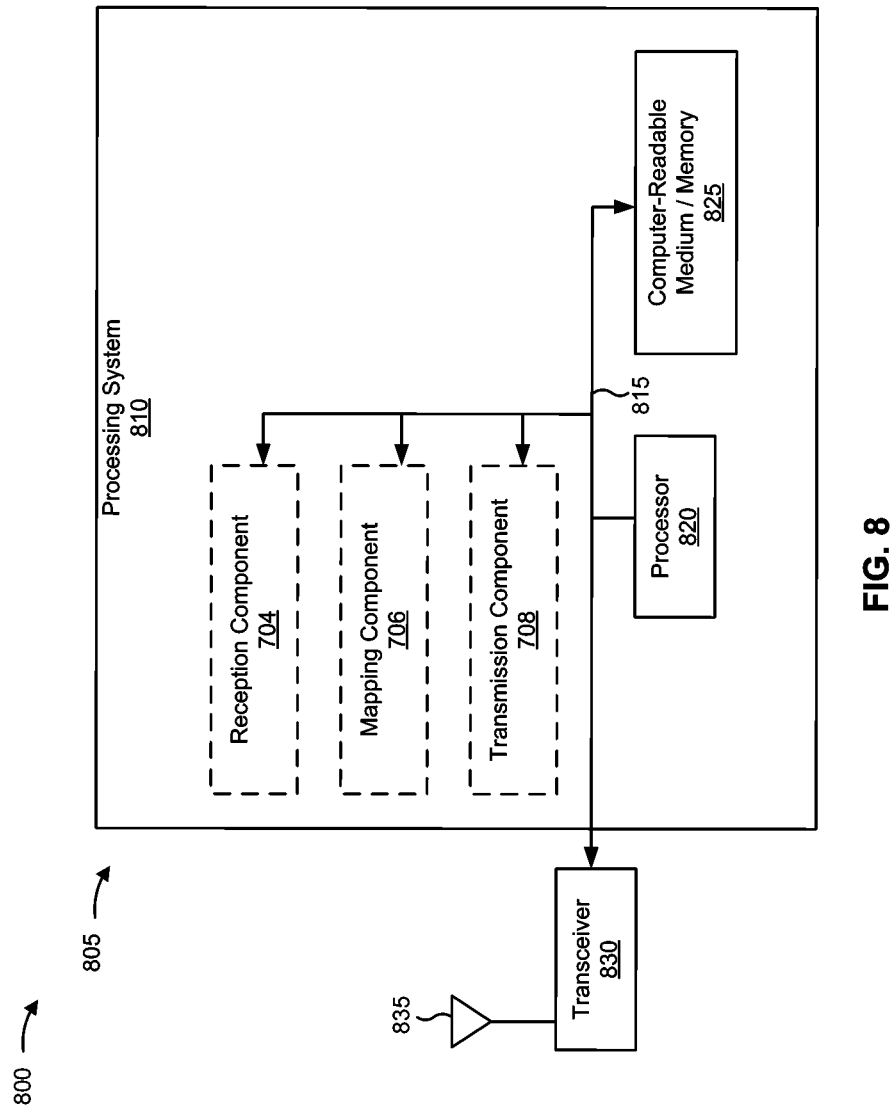
FIG. 8 is a diagram illustrating an example of a hardware implementation for an apparatus employing a processing system.

FIG. 8 is a diagram 800 illustrating an example of a hardware implementation for an apparatus 805 employing a processing system 810. The apparatus 805 may be a base station.

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the components 704, 706, and/or 708, and the computer-readable medium/memory 825. The bus 815 may also link various other circuits such as timing sources, peripherals, voltage regulators, and power management circuits, which are well known in the art, and therefore will not be described any further.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 704. In addition, the transceiver 830 receives information from the processing system 810, specifically the transmission component 708, and based at least in part on the received information, generates a signal to be applied to the one or more antennas 835.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/memory 825 may also be used for storing data that is manipulated by the processor 820 when executing software. The processing system further includes at least one of the components 704, 706, and/or 708. The components may be software modules running in the processor 820, resident/stored in the computer readable medium/memory 825, one or more hardware modules coupled to the processor 820, or some combination thereof.

In some aspects, the processing system 810 may be a component of the base station 110 and may include the memory 242 and/or at least one of the TX MIMO processor 230, the RX processor 238, and/or the controller/processor 240. In some aspects, the apparatus 805 for wireless communication includes means for mapping a downlink control channel candidate to a set of CCEs based at least in part on a hopping pattern; means for transmitting the downlink control channel candidate on the set of CCEs; means for transmitting information indicating a configuration for the hopping pattern; means for transmitting information triggering or activating the hopping pattern; and means for transmitting information deactivating the hopping pattern. The aforementioned means may be one or more of the aforementioned components of the apparatus 702 and/or the processing system 810 of the apparatus 805 configured to perform the functions recited by the aforementioned means. As described elsewhere herein, the processing system 810 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 8 is provided as an example. Other examples may differ from what is described in connection with FIG. 8.

Figure 9:
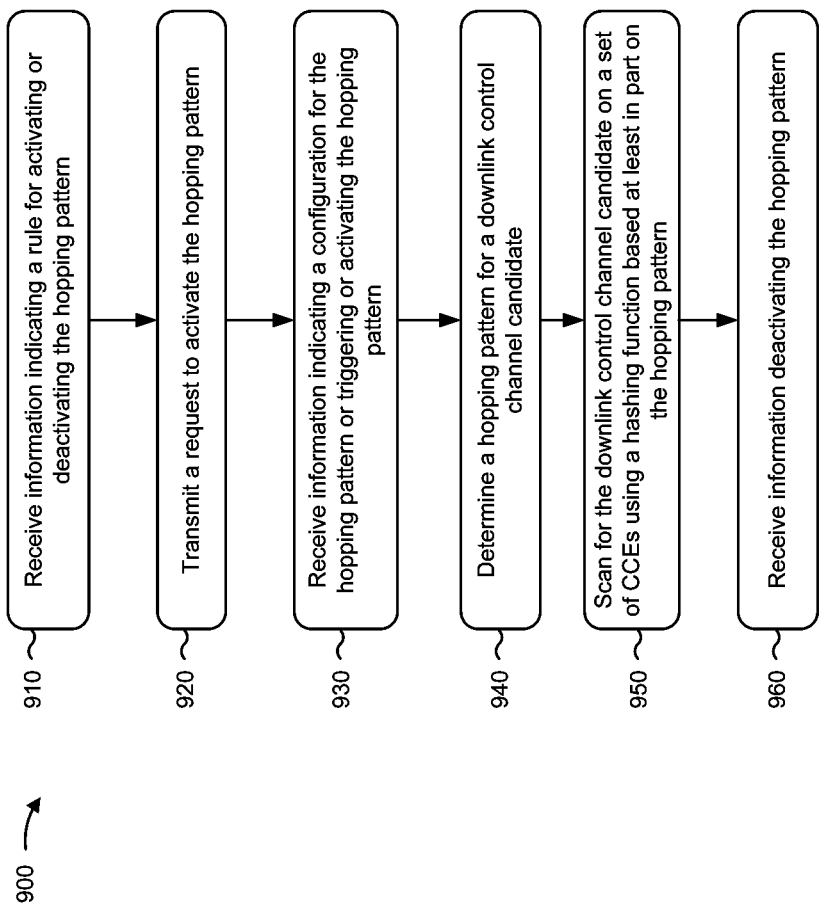
FIG. 9 is a flowchart of a method of wireless communication.

FIG. 9 is a flowchart of a method 900 of wireless communication. The method may be performed by a UE (e.g., the UE 120 of FIG. 1, the apparatus 1002/1105, and/or the like).

At 910, the UE (e.g., using antenna 252, DEMOD 254, MIMO detector 256, receive processor 258, controller/processor 280, and/or the like) may receive information indicating a rule for activating or deactivating the hopping pattern. In some aspects, the information may indicate the hopping pattern. For example, the information may comprise a PDCCH hopping pattern or multiple PDCCH hopping patterns.

At 920, the UE (e.g., using controller/processor 280, transmit processor 264, TX MIMO processor 266, MOD 254, antenna 252, and/or the like) may transmit a request to activate the hopping pattern. For example, the UE may transmit the request based at least in part on a condition being satisfied or a device type of the UE.

At 930, the UE (e.g., using antenna 252, DEMOD 254, MIMO detector 256, receive processor 258, controller/processor 280, and/or the like) may receive information indicating a configuration for the hopping pattern or triggering or activating the hopping pattern. The information may include, for example, DCI, a MAC-CE, RRC signaling, and/or the like. In some aspects, the information may indicate the configuration for the hopping pattern from a plurality of configurations.

At 940, the UE (e.g., using antenna 252, DEMOD 254, MIMO detector 256, receive processor 258, controller/processor 280, and/or the like) may determine a hopping pattern for a downlink control channel candidate. For example, the UE may determine the hopping pattern based at least in part on the signaling described above. In some aspects, the UE may determine the hopping pattern based at least in part on a configuration of the UE (e.g., as specified by a wireless communication standard and/or the like). In some aspects, the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping.

At 950, the UE (e.g., using antenna 252, DEMOD 254, MIMO detector 256, receive processor 258, controller/ processor 280, and/or the like) may scan for the downlink control channel candidate on a set of CCEs based at least in part on the hopping pattern. For example, the UE may receive control information in accordance with the hopping pattern.

At 960, the UE (e.g., using antenna 252, DEMOD 254, MIMO detector 256, receive processor 258, controller/ processor 280, and/or the like) may receive information deactivating the hopping pattern. For example, this information may include DCI, RRC signaling, a MAC-CE, and/or the like. In some aspects, the UE may determine that the hopping pattern is to be deactivated (e.g., without receiving such signaling from the base station).

Method 900 may include additional aspects, such as any single aspect or any combination of aspects described below and/or in connection with one or more other processes described elsewhere herein.

In a first aspect, the hopping pattern is based at least in part on at least one of: a starting symbol number within a slot or a span, a slot number within a frame, a system frame number, a bandwidth part, a sub-band, a CORESET number based at least in part on the hopping pattern using cross-CORESET hopping, or a search space number based at least in part on the hopping pattern using cross-search space hopping.

In a second aspect, alone or in combination with the first aspect, the hopping pattern uses a control resource set mapping function, of the function, associated with a divisor greater than 3.

In a third aspect, alone or in combination with one or more of the first and second aspects, the hopping pattern is performed within a sub-band or a bandwidth part.

In a fourth aspect, alone or in combination with one or more of the first through third aspects, the hopping pattern is specific to the sub-band or the bandwidth part.

In a fifth aspect, alone or in combination with one or more of the first through fourth aspects, the hopping pattern is performed across two or more sub-bands or bandwidth parts.

In a sixth aspect, alone or in combination with one or more of the first through fifth aspects, the hopping pattern is consistent across a bandwidth part change.

In a seventh aspect, alone or in combination with one or more of the first through sixth aspects, the hopping pattern is used for a subset of downlink control channel candidates that includes the downlink control channel candidate.

In an eighth aspect, alone or in combination with one or more of the first through seventh aspects, the hopping pattern is used for all downlink control channel candidates associated with the base station or the UE.

In a ninth aspect, alone or in combination with one or more of the first through eighth aspects, the hopping pattern is used for all control resource sets associated with the UE.

In a tenth aspect, alone or in combination with one or more of the first through ninth aspects, the hopping pattern is based at least in part on a combination of at least two of: a control resource set of the downlink control channel candidate, a search space of the downlink control channel candidate, an aggregation level of the downlink control channel candidate, or a carrier of the downlink control channel candidate.

In an eleventh aspect, alone or in combination with one or more of the first through tenth aspects, method 900 includes receiving information indicating a configuration for the hopping pattern or triggering or activating the hopping pattern.

In a twelfth aspect, alone or in combination with one or more of the first through eleventh aspects, method 900 includes receiving information deactivating the hopping pattern.

In a thirteenth aspect, alone or in combination with one or more of the first through twelfth aspects, the hopping pattern is associated with a timer for deactivation of the hopping pattern.

In a fourteenth aspect, alone or in combination with one or more of the first through thirteenth aspects, method 900 includes receiving information indicating a rule for activating or deactivating the hopping pattern or indicating the hopping pattern.

In a fifteenth aspect, alone or in combination with one or more of the first through fourteenth aspects, method 900 includes transmitting a request to activate or deactivate the hopping pattern.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
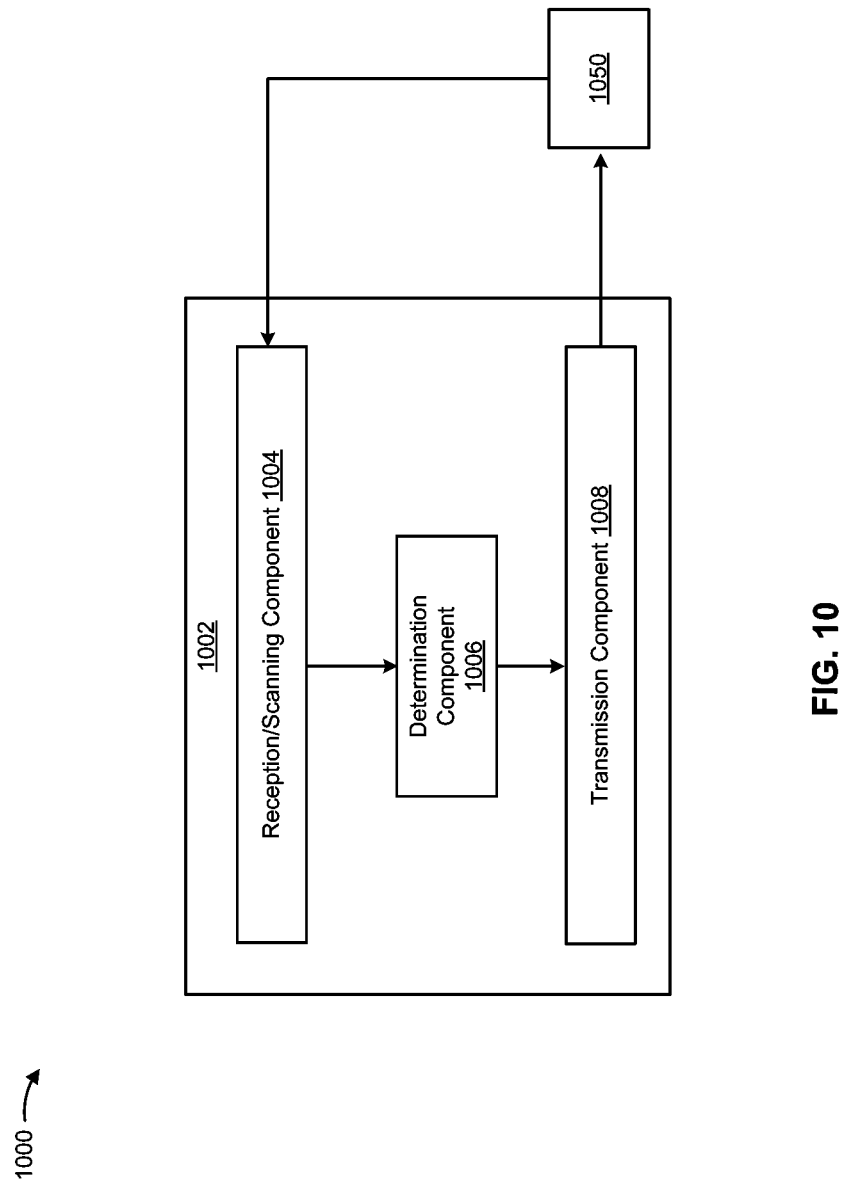
FIG. 10 is a data flow diagram illustrating data flow between different components in an example apparatus.

FIG. 10 is a conceptual data flow diagram 1000 illustrating the data flow between different components in an example apparatus 1002. The apparatus 1002 may be a UE. In some aspects, the apparatus 1002 includes a reception/ scanning component 1004, a determination component 1006, and/or a transmission component 1008. As shown, the apparatus 1002 may communicate with another apparatus 1050 (e.g., a UE, a base station, or another wireless communication device) using the reception/scanning component 1004 and/or the transmission component 1008.

The determination component 1006 may determine a hopping pattern for a downlink control channel candidate. For example, the determination component may determine the hopping pattern based at least in part on information received from the apparatus 1050. The reception/scanning component 1004 may scan for control information (e.g., also referred to as scanning for the downlink control channel candidate) on a set of CCEs based at least in part on the hopping pattern. In some aspects, the reception/scanning component 1004 may receive information indicating a configuration for the hopping pattern or triggering or activating the hopping pattern, information deactivating the hopping pattern, information indicating a rule for activating or deactivating the hopping pattern or indicating the hopping pattern, and/or the like. The transmission component 1008 may transmit a request to the apparatus 1050, such as a request to activate or deactivate the hopping pattern.

The apparatus may include additional components that perform each of the blocks of the algorithm in the aforementioned method 900 of FIG. 9 and/or the like. Each block in the aforementioned method 900 of FIG. 9 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
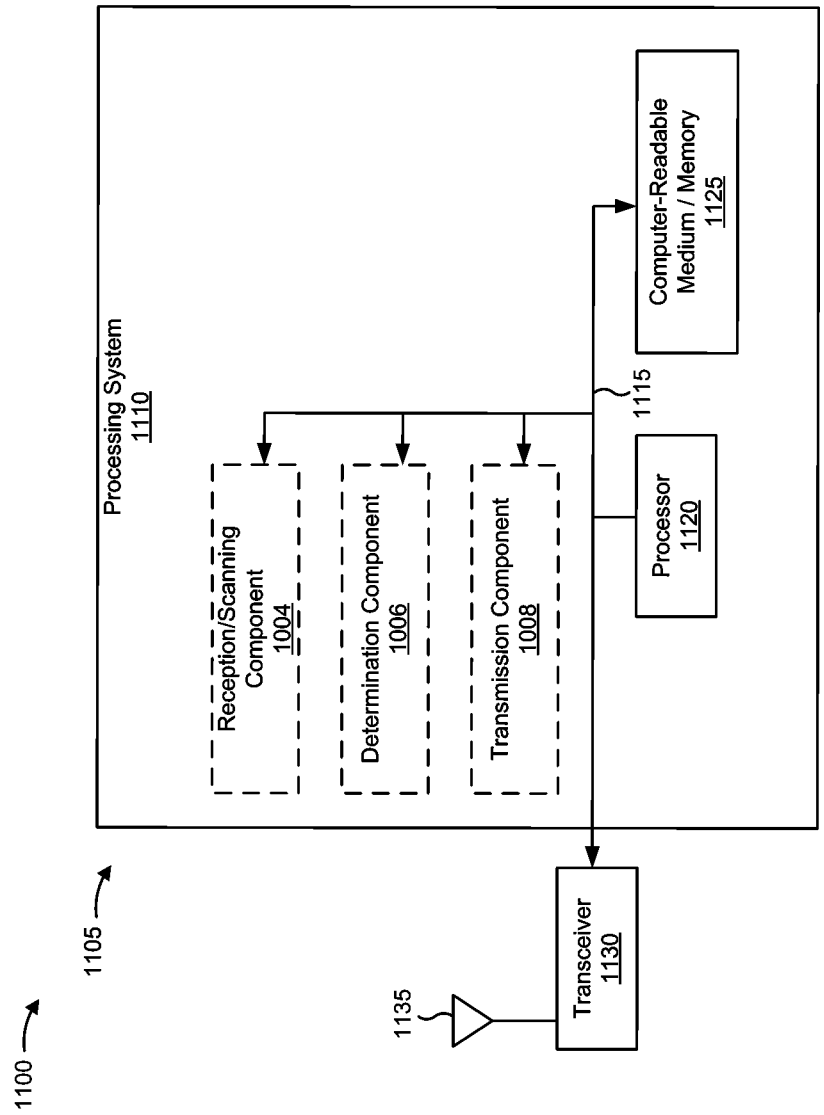
FIG. 11 is a diagram illustrating an example of a hardware implementation for an apparatus employing a processing system.

FIG. 11 is a diagram 1100 illustrating an example of a hardware implementation for an apparatus 1105 employing a processing system 1110. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the components 1004, 1006, and/or 1008, and the computer-readable medium/memory 1125. The bus 1115 may also link various other circuits such as timing sources, peripherals, voltage regulators, and power management circuits, which are well known in the art, and therefore will not be described any further.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception/scanning component 1004. In addition, the transceiver 1130 receives information from the processing system 1110, specifically the transmission component 1008, and based at least in part on the received information, generates a signal to be applied to the one or more antennas 1135.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the components 1004, 1006, and/or 1008. The components may be software modules running in the processor 1120, resident/stored in the computer readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for determining a hopping pattern for a downlink control channel candidate; means for scanning for the downlink control channel candidate on a set of CCEs based at least in part on the hopping pattern; means for receiving information indicating a configuration for the hopping pattern or triggering or activating the hopping pattern; means for receiving information deactivating the hopping pattern; means for receiving information indicating a rule for activating or deactivating the hopping pattern or indicating the hopping pattern; and means for transmitting a request to activate or deactivate the hopping pattern. The aforementioned means may be one or more of the aforementioned components of the apparatus 1002 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following provides an overview of some aspects of the present disclosure:

Aspect 1: A method of wireless communication performed by a user equipment (UE), comprising: determining a hopping pattern for a downlink control channel candidate, wherein the hopping pattern is based at least in part on at least one of: and scanning for the downlink control channel candidate on a set of control channel elements (CCEs) based at least in part on the hopping pattern.

Aspect 2: The method of aspect 1, wherein the hopping pattern uses a control resource set mapping function associated with a divisor greater than 3.

Aspect 3: The method of any of aspects 1-2, wherein the hopping pattern is performed within a sub-band or a bandwidth part.

Aspect 4: The method of aspect 3, wherein the hopping pattern is specific to the sub-band or the bandwidth part.

Aspect 5: The method of any of aspects 1-2, wherein the hopping pattern is performed across two or more sub-bands or bandwidth parts.

Aspect 6: The method of aspect 5, wherein the hopping pattern is consistent across a bandwidth part change.

Aspect 7: The method of any of aspects 1-6, wherein the hopping pattern is used for a subset of downlink control channel candidates that includes the downlink control channel candidate.

Aspect 8: The method of any of aspects 1-6, wherein the hopping pattern is used for all downlink control channel candidates associated with the UE or a base station associated with the downlink control channel candidate.

Aspect 9: The method of any of aspects 1-8, wherein the hopping pattern is used for all control resource sets associated with the UE or a base station associated with the downlink control channel candidate.

Aspect 10: The method of any of aspects 1-9, wherein the hopping pattern is based at least in part on a combination of at least two of: a control resource set of the downlink control channel candidate, a search space of the downlink control channel candidate, an aggregation level of the downlink control channel candidate, or a carrier of the downlink control channel candidate.

Aspect 11: The method of any of aspects 1-10, further comprising: receiving information indicating a configuration for the hopping pattern, wherein the information indicating the configuration includes a dynamic parameter that overrides a semi-static parameter associated with the configuration.

Aspect 12: The method of any of aspects 1-11, further comprising: receiving information triggering or activating the hopping pattern.

Aspect 13: The method of aspect 12, wherein the hopping pattern is configured and activated dynamically.

Aspect 14: The method of aspect 12, wherein the hopping pattern is configured and activated semi-statically.

Aspect 15: The method of aspect 12, wherein the information triggering or activating the hopping pattern indicates a set of parameters for which the hopping pattern is triggered or activated.

Aspect 16: The method of any of aspects 1-15, further comprising: receiving information deactivating the hopping pattern.

Aspect 17: The method of any of aspects 1-16, wherein the hopping pattern is associated with a timer for deactivation of the hopping pattern.

Aspect 18: The method of any of aspects 1-17, further comprising: receiving information indicating a rule for activating or deactivating the hopping pattern or indicating the hopping pattern; and activating or deactivating the hopping pattern in accordance with the rule.

Aspect 19: The method of any of aspects 1-18, further comprising: transmitting a request to activate or deactivate the hopping pattern.

Aspect 20: A method of wireless communication performed by a base station, comprising: mapping a downlink control channel candidate to a set of control channel elements (CCEs) based at least in part on a hopping pattern, wherein the hopping pattern is based at least in part on at least one of: a search space number based at least in part on the hopping pattern using cross-search space hopping; and transmitting the downlink control channel candidate on the set of CCEs.

Aspect 21: The method of aspect 20, wherein the hopping pattern uses a control resource set mapping function associated with a divisor greater than 3.

Aspect 22: The method of any of aspects 20-21, wherein the hopping pattern is performed within a sub-band or a bandwidth part.

Aspect 23: The method of any of aspects 20-22, wherein the hopping pattern is performed across two or more sub-bands or bandwidth parts.

Aspect 24: The method of any of aspects 20-23, wherein the hopping pattern is based at least in part on a combination of at least two of: a control resource set of the downlink control channel candidate, a search space of the downlink control channel candidate, an aggregation level of the downlink control channel candidate, or a carrier of the downlink control channel candidate.

Aspect 25: The method of any of aspects 20-24, further comprising: transmitting information triggering or activating the hopping pattern, wherein the information triggering or activating the hopping pattern indicates a set of parameters for which the hopping pattern is triggered or activated.

Aspect 26: An apparatus for wireless communication at a device, comprising a processor; memory coupled with the processor; and instructions stored in the memory and executable by the processor to cause the apparatus to perform the method of one or more aspects of aspects 1-25.

Aspect 27: A device for wireless communication, comprising a memory and one or more processors coupled to the memory, the memory and the one or more processors configured to perform the method of one or more aspects of aspects 1-25.

Aspect 28: An apparatus for wireless communication, comprising at least one means for performing the method of one or more aspects of aspects 1-25.

Aspect 29: A non-transitory computer-readable medium storing code for wireless communication, the code comprising instructions executable by a processor to perform the method of one or more aspects of aspects 1-25.

Aspect 30: A non-transitory computer-readable medium storing a set of instructions for wireless communication, the set of instructions comprising one or more instructions that, when executed by one or more processors of a device, cause the device to perform the method of one or more aspects of aspects 1-25.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   determining a hopping pattern for a downlink control channel candidate, wherein the hopping pattern is based at least in part on at least one of:
   a starting symbol number within a slot or a span,
   a slot number, within a frame, that changes over time,
   a system frame number,
   a bandwidth part, a sub-band,
a control resource set (CORESET) number based at least in part on the hopping pattern using cross-CORESET hopping, or
a search space of the downlink control channel candidate; and
scanning for the downlink control channel candidate on a set of control channel elements (CCEs) based at least in part on the hopping pattern.

2. The method of claim 1, wherein the hopping pattern uses a control resource set mapping function associated with a divisor greater than 3.

3. The method of claim 1, wherein the hopping pattern is performed within a sub-band or a bandwidth part.

4. The method of claim 3, wherein the hopping pattern is specific to the sub-band or the bandwidth part.

5. The method of claim 1, wherein the hopping pattern is performed across two or more sub-bands or bandwidth parts.

6. The method of claim 5, wherein the hopping pattern is consistent across a bandwidth part change.

7. The method of claim 1, wherein the hopping pattern is used for a subset of downlink control channel candidates that includes the downlink control channel candidate.

8. The method of claim 1, wherein the hopping pattern is used for all downlink control channel candidates associated with the UE or a network entity associated with the downlink control channel candidate.

9. The method of claim 1, wherein the hopping pattern is used for all control resource sets associated with the UE or a network entity associated with the downlink control channel candidate.

10. The method of claim 1, wherein the hopping pattern is based at least in part on a combination of at least two of:
a control resource set of the downlink control channel candidate,
the search space of the downlink control channel candidate,
an aggregation level of the downlink control channel candidate, or
a carrier of the downlink control channel candidate.

11. The method of claim 1, further comprising:
receiving information indicating a configuration for the hopping pattern,
wherein the information indicating the configuration includes a dynamic parameter that overrides a semi-static parameter associated with the configuration.

12. The method of claim 1, further comprising:
receiving information triggering or activating the hopping pattern.

13. The method of claim 12, wherein the hopping pattern is configured and activated dynamically.

14. The method of claim 12, wherein the hopping pattern is configured and activated semi-statically.

15. The method of claim 12, wherein the information triggering or activating the hopping pattern indicates a set of parameters for which the hopping pattern is triggered or activated.

16. The method of claim 1, further comprising:
receiving information deactivating the hopping pattern.

17. The method of claim 1, wherein the hopping pattern is associated with a timer for deactivation of the hopping pattern.

18. The method of claim 1, further comprising:
receiving information indicating a rule for activating or deactivating the hopping pattern or indicating the hopping pattern; and
activating or deactivating the hopping pattern in accordance with the rule.

19. The method of claim 1, further comprising:
transmitting a request to activate or deactivate the hopping pattern.

20. A method of wireless communication performed by a network entity, comprising:
mapping a downlink control channel candidate to a set of control channel elements (CCEs) based at least in part on a hopping pattern, wherein the hopping pattern is based at least in part on at least one of:
a starting symbol number within a slot or a span,
a slot number, within a frame, that changes over time,
a system frame number,
a bandwidth part,
a sub-band,
a control resource set (CORESET) number based at least in part on the hopping pattern using cross-CORESET hopping, or
a search space of the downlink control channel candidate; and
transmitting the downlink control channel candidate on the set of CCEs.

21. The method of claim 20, wherein the hopping pattern uses a control resource set mapping function associated with a divisor greater than 3.

22. The method of claim 20, wherein the hopping pattern is performed within a sub-band or a bandwidth part.

23. The method of claim 20, wherein the hopping pattern is performed across two or more sub-bands or bandwidth parts.

24. The method of claim 20, wherein the hopping pattern is based at least in part on a combination of at least two of:
a control resource set of the downlink control channel candidate,
the search space of the downlink control channel candidate,
an aggregation level of the downlink control channel candidate, or
a carrier of the downlink control channel candidate.

25. The method of claim 20, further comprising:
transmitting information triggering or activating the hopping pattern, wherein the information triggering or activating the hopping pattern indicates a set of parameters for which the hopping pattern is triggered or activated.

26. A network entity for wireless communication, comprising:
a memory; and
one or more processors coupled to the memory and configured to:
map a downlink control channel candidate to a set of control channel elements (CCEs) based at least in part on a hopping pattern, wherein the hopping pattern is based at least in part on at least one of:
a starting symbol number within a slot or a span,
a slot number, within a frame, that changes over time,
a system frame number,
a bandwidth part,
a sub-band,
a control resource set (CORESET) number based at least in part on the hopping pattern using cross-CORESET hopping, or
a search space of the downlink control channel candidate; and transmit the downlink control channel candidate on the set of CCEs.

27. The network entity of claim 26, wherein the hopping pattern is based at least in part on a combination of at least two of:
    a control resource set of the downlink control channel candidate,
    the search space of the downlink control channel candidate,
    an aggregation level of the downlink control channel candidate, or
    a carrier of the downlink control channel candidate.

28. The network entity of claim 26, wherein the one or more processors are further configured to:
    transmit information indicating a configuration for the hopping pattern.

29. A user equipment (UE) for wireless communication, comprising:
    a memory; and
    one or more processors coupled to the memory and configured to:
        determine a hopping pattern for a downlink control channel candidate, wherein the hopping pattern is based at least in part on at least one of:
            a starting symbol number within a slot or a span,
            a slot number, within a frame, that changes over time,
            a system frame number,
            a bandwidth part,
            a sub-band,
            a control resource set (CORESET) number based at least in part on the hopping pattern using cross-CORESET hopping, or
            a search space of the downlink control channel candidate; and
        scan for the downlink control channel candidate on a set of control channel elements (CCEs) based at least in part on the hopping pattern.

30. The UE of claim 29, wherein the one or more processors are further configured to:
    receive information indicating a configuration for the hopping pattern or triggering or activating the hopping pattern.

* * * * *